March 4, 1958

D. S. KELLAM 2,825,525

HOSE CLAMP

Filed Dec. 22, 1953

David S. Kellam
INVENTOR

BY *C. A. Snow & Co.*

ATTORNEYS.

March 4, 1958     D. S. KELLAM     2,825,525
HOSE CLAMP
Filed Dec. 22, 1953     2 Sheets-Sheet 2
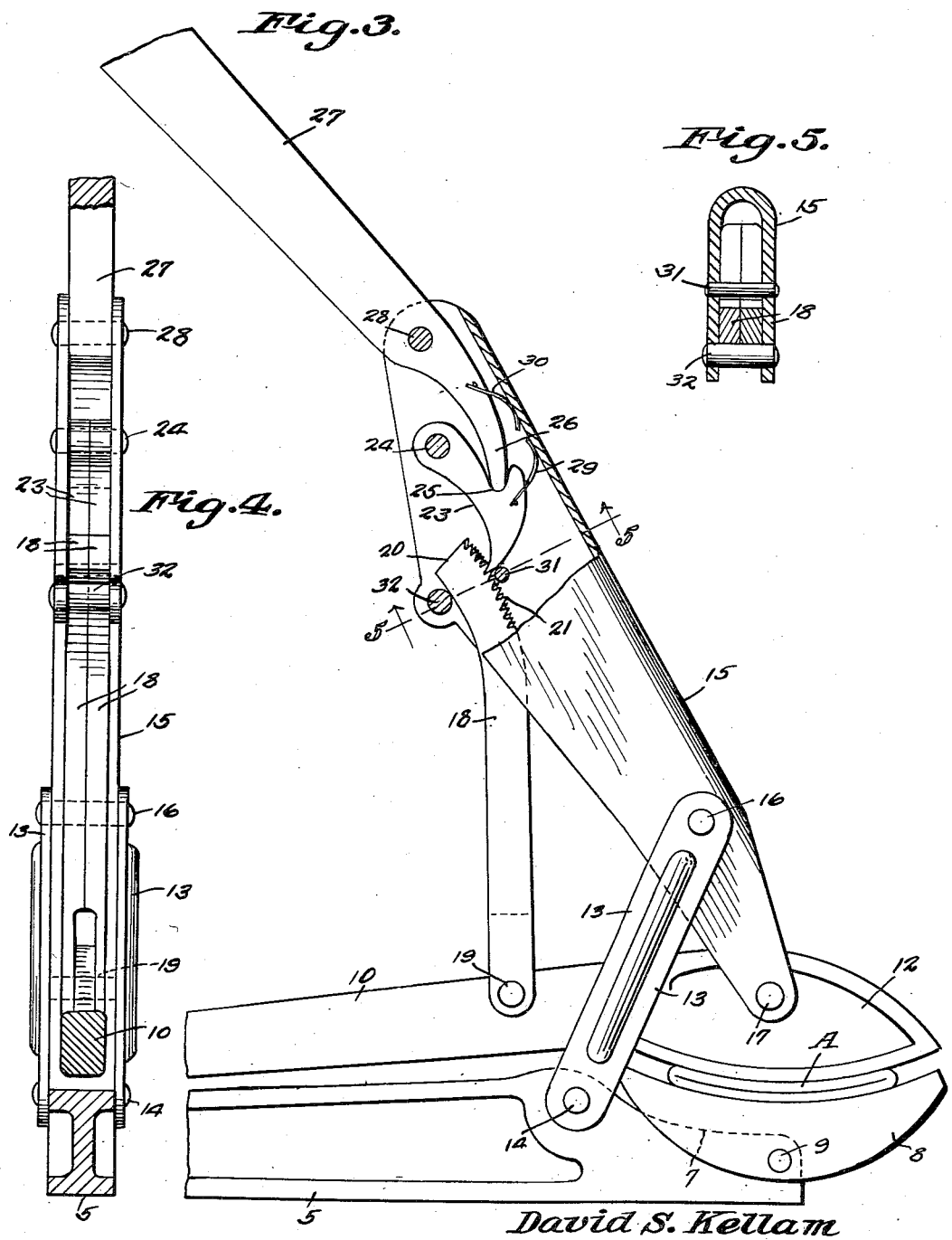
David S. Kellam
INVENTOR
BY C. A. Snow & Co.
ATTORNEYS.

United States Patent Office 2,825,525
Patented Mar. 4, 1958

2,825,525

HOSE CLAMP

David S. Kellam, Atlanta, Ga.

Application December 22, 1953, Serial No. 399,726

3 Claims. (Cl. 251—9)

By way of explanation, it might be stated that in the use of the conventional hose clamp employed in cutting off the flow of water through a fire hose or the like, independently of the hydrant valve, the clamp is frequently operated with such force as to render the release of the clamp difficult by a person of normal strength with the resultant loss of time, and making it necessary to apply unusual force, and frequently to use mechanical means to operate the lever of the clamp to open the jaws thereof, in releasing the clamp.

Since the controlling factor in the value of a clamp of this character resides in the ease and speed of operation, the loss of time in releasing the clamp is objectionable.

It is therefore the primary object of the present invention to improve generally the construction of the hose clamp as embodied in my Patent Number 2,064,919, issued December 22, 1936, by providing a hose clamp which may be operated to securely clamp a hose, and at the same time may be operated to readily release the hose clamp with the minimum amount of exertion on the part of the operator, when it is desired to resume the flow of water through the hose.

An important object of the invention is the provision of means for moving and locking the movable jaw of the clamp in clamping relation with the hose, the locking means being actuated simultaneously with the operation of the lever, in moving the movable jaw into clamping relation with the stationary jaw of the clamp.

Still another object of the invention is to provide locking pawls with which the operating lever of the hose clamp operates in automatically moving the locking means to either its locked or unlocked position, the locking means being so constructed and arranged that it becomes effective as the lever moves beyond a predetermined position.

A further object of the invention is to provide a hose clamp wherein the locking pawls thereof form a continuation of the operating lever, thereby to increase the leverage of the operating lever to the maximum.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings:

Fig. 3 is an elevational view of the hose clamp illustrating the position of the lever and locking pawls when the jaws are in their locked positions.

Fig. 4 is a rear elevational view of the clamp.

Fig. 5 is a sectional view taken on line 5—5 of Fig. 3.

Figure 1:
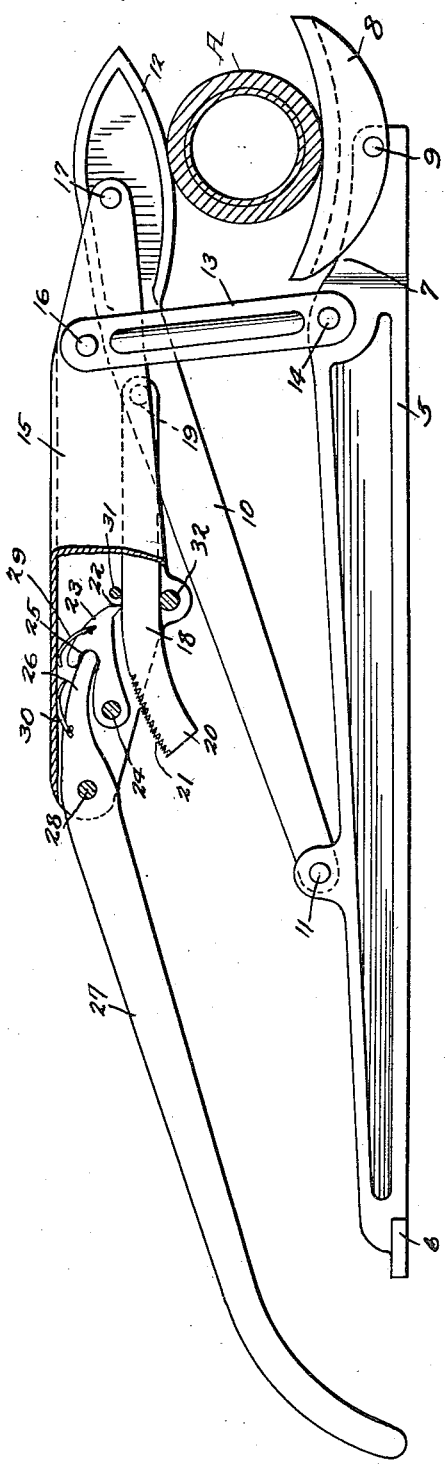
Figure 1 is a side elevational view of a hose clamp constructed in accordance with the invention, illustrating a hose disposed between the jaws of the clamp prior to clamping the hose.

Referring to the drawings in detail, the clamp includes a base portion 5 which is in the form of an elongated bar of substantially I-beam construction, the transverse bar 6 being formed at one end of the base to provide a support for the base, holding the support in an upright position, as better shown by Fig. 1 of the drawings.

As clearly shown by the drawings, the forward end of the base 5 has its upper edge curved downwardly at 7, providing a support for the pivoted jaw 8 which is secured to the forward end of the base 5, by means of the pivot pin 9, which allows the jaw 8 to tilt slightly to properly grip the hose which is positioned between the jaws of the clamp, the hose in the present showing being indicated by the reference character A.

This pivoted jaw 8 is formed with spaced flanges that fit over the upper edge of the base 5 at the forward end thereof, as shown by Fig. 1 of the drawings.

The reference character 10 indicates a bar which is pivotally connected to the base 5 at 11, the bar being formed with a jaw 12 which overlies the pivoted jaw 8 in such a way that when the bar 10 moves towards the base 5, the jaws 8 and 12 will clamp a hose held therebetween.

Figure 2:
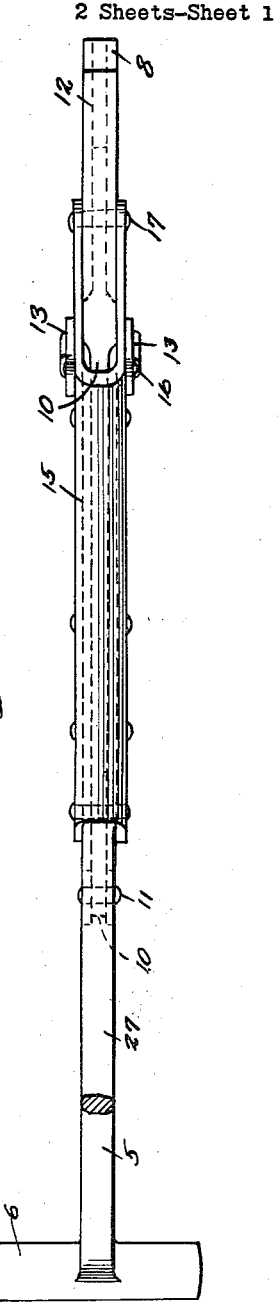
Fig. 2 is a plan view thereof.

Links 13 are pivotally connected to the base 5 at 14 and are disposed on opposite sides of the base 5, the other ends of the links 13 being pivotally connected to the bar 15 at 16, the bar 15 having its forward end forked and positioned over the side edges of the jaw 12, as shown by Fig. 2 of the drawings, where it is pivotally connected with the jaw 12 at 17.

This bar 15 is substantially inverted U-shape to provide a housing for the lock bar 18, which is pivotally connected to the bar 10 at 19.

As clearly shown by Fig. 1 of the drawings, the rear end of the lock bar 18 is curved downwardly at 20, the upper edge thereof being formed with a pair of rows of substantially short teeth 21 that are extended upwardly for contact with the pointed ends 22 of the pawls 23 that are pivotally connected between the side walls of the bar 15, at 24. The rear surfaces of the pawls 23 are formed with recesses 25 in which the forward reduced end 26 of the operating lever 27 is disposed, the operating lever being pivotally connected between the side walls of the member 5, at 28.

Formed in the upper edge of each pawl 23, is a transversely disposed slot in which one end of a leaf spring 29 is secured, the opposite ends of said leaf springs being curved and engaged with the inner surface of the member 15, normally urging the pawls towards the bar 10 so that as the rear end of the bar 15 swings upwardly, the pointed ends 22 of the pawls 23 will engage the teeth 21, associated therewith, locking the bar 18 against movement, with the result that the jaws of the clamp securely grip the hose disposed therebetween.

The forward reduced end 26 of the lever 27 is also formed with a slot which is inclined forwardly, into which one end of the spring 30 is secured, the free end of the spring being slightly curved to rub against the inner surface of the bottom 15, normally biasing the forward reduced end of the lever 27 downwardly. This spring 30 also provides means for counterbalancing the weight of the operating lever 27 to hold the same in its upper position as shown by Fig. 3 of the drawings.

Extending across the interior of the bar 15, and secured to the side walls thereof, is a pin 31 which provides a stop to restrict upward movement of the lock bar 18, while pin 32 restricts downward movement thereof.

In operation, the clamp is positioned on a supporting surface, the lever 27 being moved to its lowermost position, which results in the opening of the jaws 8 and 12, The clamp is now positioned over the hose in a manner as shown by Fig. 1. Upon movement of the operating lever 27 upwardly to the position as shown by Fig. 3 of the drawings, the reduced forward end 26 of the lever will move the pawls 23 over the upper edge of the lock bar 18 until the pointed ends thereof engage the teeth 21, securely locking the clamp in its clamping position to cut off the flow of water through the hose clamped by the device. Downward movement of lever 27 will correspondingly, through the action of end 26 on the upper surface of recess 25 cause pawls 23 to act as a rigid unit with lever 27 and disengage the pawls 23 from the teeth 21 to release the clamping effect of jaw 12. Stop pins 30 and 31 limit movement of the lock bar 18 whereby in the clamping and unclamping movements, or the opening of the jaws, the operating lever 27 and channel bars 15 form a rigid lever unit turning about the fulcrum provided by links 13. Owing to the fact that the teeth 21 are substantially short, it is an easy matter to move the lever 27 downwardly, since the increased leverage between the forward reduced end 26 of the bar 27 and pawls 23, will permit such movement with the minimum amount of exertion on the part of the person operating the operating lever 27, thereby unlocking and releasing the jaws to the action of the water passing through the hose under pressure, which action expands the hose and forces the jaws open. The clamp may now be removed.

Having thus described the invention, what is claimed is:

1. In a hose clamp, a base, a jaw secured at the forward end of said base, an upper bar pivotally connected to said base, a jaw on the forward end of said upper bar cooperating with the jaw of the base in gripping a hose, a channel bar pivotally connected adjacent its forward end with said upper bar, fulcrum links pivotally connecting said channel bar with said base adjacent its jaws, a lock bar having its forward end pivotally connected to said upper bar and disposed within said channel bar, teeth formed on the upper edge of said lock bar, guide means for said lock bar, an operating lever pivotally connected to said channel bar, a pawl pivotally mounted within said channel bar, means forming a recess in said pawl engaging the end of said operating lever to limit the movement of said operating lever relative to said pawl, said pawl releasably engaging said teeth on said lock bar, providing a movable connection between said operating lever and lock bar for securing the upper bar and jaws in their active gripping positions when said lever and channel bar are swung upwardly, said guide means restraining pivotal movement of said lock bar upon engagement of said pawl with the teeth of said bar, downward movement of said lever releasing said pawl from its engagement with said teeth upon contact of the end of said lever with the stop formed by the top of said recess.

2. In a hose clamp, a base, an upper bar pivotally connected to said base, cooperating jaws on the forward ends of said base and upper bar, a channel bar pivotally connected adjacent its end with said upper bar adjacent its jaw, fulcrum links pivotally connecting said channel bar to said base, a lock bar pivotally connected at its forward end to said upper bar and extending rearwardly, one end of the lock bar having teeth formed in the upper edge thereof, an operating lever pivotally connected with the channel bar, one end of said operating lever extending forwardly beyond the pivot point thereof, a pawl pivotally connected to said channel bar between said operating lever and lock bar, means forming a recess in said pawl engaging the end of said operating lever to limit the movement of said operating lever relative to said pawl, said pawl releasably engaging said teeth on said lock bar, guide means for said lock bar for restraining the pivotal movement of said lock bar upon engagement of said pawl with the teeth of said lock bar, whereby as said operating lever is swung upwardly, said lock bar and upper bar are swung about their respective pivots, clamping a hose between the jaws of the clamp, said pawl engaging said teeth locking the jaws in a closed position on a hose.

3. In a hose clamp, a base, an upper bar pivotally connected to said base at a point intermediate the ends of the base, the forward ends of said base and upper bar being disposed opposite to each other, jaws on said upper bar and base cooperating in gripping a hose therebetween, a channel bar pivotally connected with the upper bar adjacent its jaw, fulcrum links pivotally connecting the channel bar with said base at a point adjacent to the jaws thereof, a locking bar pivotally connected at its forward end with said upper bar and disposed within said channel bar, teeth formed on the upper edge of said lock bar, an operating lever pivotally connected with the upper bar above said lock bar, pivoted pawls disposed between the operating lever and lock bar in contact with the operating lever and lock bar for effecting movement of said upper bar simultaneously locking the upper bar against movement, upon upward movement of said lever, guide means for said lock bar for restraining the pivotal movement of said lock bar upon engagement of said pawls with the teeth of said lock bar, whereby said jaws move into clamping relation with a hose disposed therebetween, and stop means associated with said pawls limiting downward movement of said operating lever relative to said pawls whereby said operating lever and said pawls move as a unit to disengage said pawls from said teeth upon downward movement of said operating lever.

References Cited in the file of this patent
UNITED STATES PATENTS

| 1,701,411 | Kellam | Feb. 5, 1929 |
| 2,009,907 | Teuber | July 30, 1935 |
| 2,064,919 | Kellam | Dec. 22, 1936 |
| 2,410,889 | Martines | Nov. 12, 1946 |